United States Patent [19]

Johnson et al.

[11] Patent Number: 4,780,019
[45] Date of Patent: Oct. 25, 1988

[54] BLIND EDGEWISE CONNECTOR

[75] Inventors: Roger N. Johnson, Mercer Island; Douglas L. Johnson, Seattle, both of Wash.

[73] Assignee: Radiant Optics Inc., Bellevue, Wash.

[21] Appl. No.: 6,949

[22] Filed: Jan. 27, 1987

[51] Int. Cl.⁴ .............................................. F16B 9/00
[52] U.S. Cl. ................... 403/195; 29/525.1; 403/239; 411/177
[58] Field of Search ............... 411/174, 173, 176, 177, 411/111, 113; 403/239, 195, 200; 52/272; 29/526 R

[56] References Cited

U.S. PATENT DOCUMENTS

| | | |
|---|---|---|
| 246,846 | 9/1881 | Wilde . |
| 362,763 | 5/1887 | McCune ........................ 403/200 |
| 568,385 | 9/1896 | Underwood et al. ................ 403/239 |
| 900,717 | 10/1908 | Feaster ........................... 403/195 X |
| 1,850,533 | 3/1932 | Church ........................... 403/239 X |
| 2,528,180 | 10/1950 | Roehl ............................. 403/195 X |
| 2,652,269 | 9/1953 | Dunlap ........................... 403/239 X |
| 2,927,807 | 3/1960 | Campbell ........................ 403/195 X |
| 3,061,869 | 11/1962 | Scalo et al. ...................... 403/239 X |
| 3,318,183 | 5/1967 | Fischer . |
| 3,338,602 | 8/1967 | Arnd ............................. 403/239 X |
| 3,482,482 | 12/1969 | Le Sage . |
| 3,798,586 | 3/1974 | Huska ............................ 403/195 X |
| 3,962,843 | 6/1976 | King, Jr. .......................... 403/243 |
| 4,094,054 | 6/1978 | Fischer ............................ 29/460 |
| 4,244,661 | 1/1981 | Dervy ............................. 403/243 |
| 4,601,621 | 7/1986 | Permoda ....................... 29/526 R X |
| 4,657,423 | 4/1987 | Neese et al. ..................... 411/176 X |

FOREIGN PATENT DOCUMENTS

| | | | |
|---|---|---|---|
| 434789 | 10/1926 | Fed. Rep. of Germany ...... 403/195 |
| 2327413 | 1/1974 | Fed. Rep. of Germany ...... 403/201 |

Primary Examiner—Lloyd A. Gall
Attorney, Agent, or Firm—Seed and Berry

[57] ABSTRACT

A connector body having a body portion insertable through a hole in a base sheet of material and an enlarged head portion so that the head portion will not pass through the hole. The body portion comprises spaced-apart, inflexible arms that project outwardly from the surface of the base sheet and define a slit therebetween. The sheet to be edgewise connected is received between the spaced-apart arms and a fastener is inserted int the slit, causing the edgewise connected sheet to be forced against one of the two opposing arms while the fastener is forced against the other opposing arm. Access for the fastener can be from the opposite side of the base sheet to which the edge connected sheet is attached through an aperture extending through the head portion and communicating with the slit or, in another embodiment, can be from the same side of the base sheet to which the edgewise connected sheet is attached. The fastener can be a screw, a resilient or rigid wedge, or a chemically expansive compound.

34 Claims, 2 Drawing Sheets

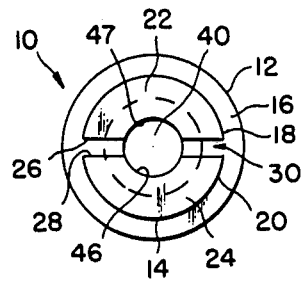
FIG. 1
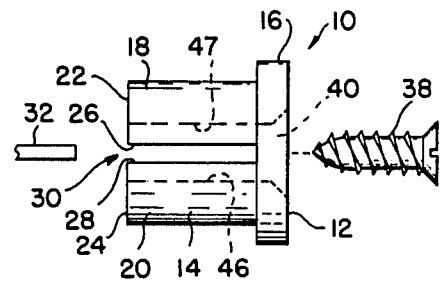
FIG. 2
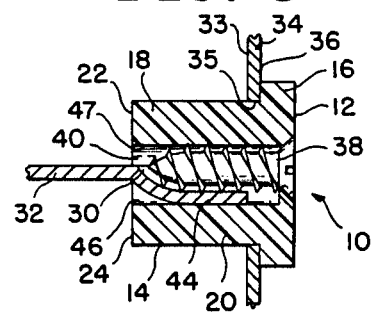
FIG. 3
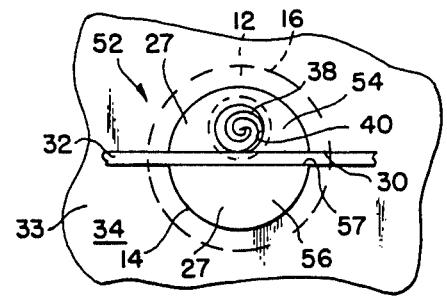
FIG. 4
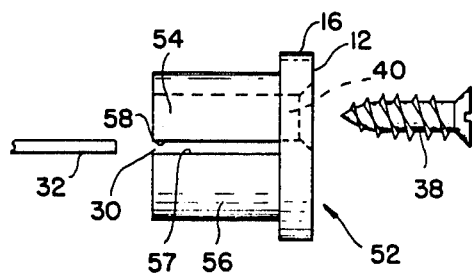
FIG. 5
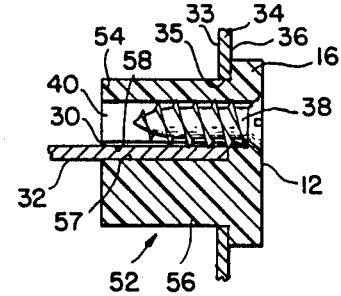
FIG. 6
FIG. 7

BLIND EDGEWISE CONNECTOR

TECHNICAL FIELD

This invention relates to connectors, and more particularly, to blind connectors for edgewise fastening a first sheet of material against a surface of a second sheet of material.

BACKGROUND OF THE INVENTION

It is frequently necessary to connect two sheets of material together, with one sheet being edgewise connected to a surface of the other. It is also often useful to be able to disassemble and reassemble such an edgewise connection of sheets.

It is known in the prior art to attach brackets and/or braces to each of the two sheets to hold them together in the desired edgewise connection. Such brackets or braces are generally attached by fasteners that require holes in both sheets. This increases the labor that must be performed to prepare the sheets for connection and the expense of fabrication. Another way to hold the sheets together in edgewise connection is to glue, weld or otherwise permanently attach them. However, these assemblies are either difficult or impossible to disassemble without damaging at least one of the sheets and ready access must exist to the points of connection from the side of the sheet where the connection is made.

In some applications requiring the connection of the edge of one sheet of material to a surface of a base sheet of material, only one surface of the base sheet is accessible. An example of such a situation is in the assembly of radiant reflectors where relatively closely spaced reflective fins are placed edgewise at angles to a base reflective surface. As such, it is convenient to be able to assemble the reflecting fins from the backside of the base reflector. In many applications, it is also advantageous to be able to disassemble the edgewise connected sheets from a base sheet while requiring access from only one side of the base sheet.

DISCLOSURE OF THE INVENTION

It is an object of the present invention to provide an edgewise connector for fastening an edge of one sheet of material to a surface of another sheet of material, while requiring access from only one side of the other sheet of material.

It is another object of the present invention to provide an edgewise connector that requires that holes be placed in only the base sheet of material.

It is yet another object of the present invention to provide an edgewise connector that allows for easy disassembly and disassembly of the connected sheets.

In general, the present invention is a blind connector for fastening an edge of a first sheet of material to a first surface of a second sheet of material through a hole formed in the second sheet, with a user needing access to the blind connector from only one surface of the second sheet. The blind connector comprises a head portion, a body portion, and fastener means. The head portion includes means to retain the head portion from pulling through the hole. The body portion is connected to the head portion and includes two relatively nondeformable, spaced-apart arm members and means for keeping the two arms spaced apart sufficiently to receive the first sheet of material edgewise therebetween. The fastener means can force the first sheet into secure engagement against one of the spaced-apart arms.

In a specific embodiment, the blind connector of the present invention can edgewise fasten the edge of a first sheet of material to a first surface of a second sheet of material through a hole formed in the second sheet, with a user needing access to the blind connector from only an opposite, second surface of the second sheet. The blind connector comprises a connector body having a head portion and a body portion adapted to be inserted through the hole in the second sheet from the side of the second surface of the second sheet. The head portion is sized sufficiently large not to pass completely through the hole and the body portion extends outwardly from the first surface of the second sheet and has a slit therein defining a pair of spaced-apart arms having opposed interior surfaces sufficiently separated to receive the first sheet edgewise. The connector body further includes an aperture extending through the head portion and into the body portion. The aperture communicates with the slit to receive a fastener, the fastener being sufficiently long to reach beyond the first surface of the second sheet and overlap the first sheet. The arms are spaced apart so that with the first sheet in position within the slit, the fastener engages one surface of the first sheet and forces the first sheet against the interior surface of one of the arms while the fastener bears against the interior surface of the other of the arms.

BRIEF DESCRIPTION OF THE DRAWINGS

FIG. 1 is an end plan view of a first embodiment of a blind edgewise connector, according to the present invention;

FIG. 2 is a side view of the blind edgewise connector of FIG. 1, showing the orientation of the edgewise connected sheet and a fastener to be used with the connector;

FIG. 3 is a cross-sectional view of the connector of FIGS. 1 and 2, showing the deformation of the edgewise connected sheet by the fastener with the connector positioned in a mounting hole in a base sheet;

FIG. 4 is an end plan view of another embodiment of the blind edgewise connector, according to the present invention with an edgewise connected sheet and fastener in position;

FIG. 5 is a side view of the blind edgewise connector of FIG. 4, showing the orientation of the edgewise connected sheet and the fastener used with the connector, with the connector positioned in a mounting hole in a base sheet;

FIG. 6 is a cross-sectional side view of the blind edgewise connector of FIGS. 4 and 5, showing the edgewise connected sheet being grasped by the fastener without producing significant deformation of the edgewise connected sheet;

FIG. 7 is a cross-sectional side view of a third embodiment of the blind edgewise connector, according to the present invention, showing the edgewise connected sheet being held at a non-peripendicular angle to the surface of the base sheet;

BEST MODE FOR CARRYING OUT THE INVENTION

Figure 8:
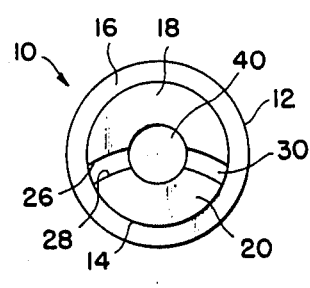
FIG. 8 is an end plan view of a fourth embodiment of the blind edgewise connector, according to the present invention.

As shown in FIGS. 1 and 2, a first embodiment of the present invention is an edgewise connector 10 having a head portion 12 and a cylindrical body portion 14. The head portion 12 has a radially outward extending flange 16. The body portion 14 includes two spaced-apart, substantially rigid arms 18 and 20 attached by one end to the head portion 12 and each having a free end 22 and 24, respectively. The arms 18 and 20 are held fixed in their spaced apart relation by their attachment to the head portion 12. The arms 18 and 20 each have an opposed, generally planar interior surface 26 and 28, respectively, and define a central slit 30 therebetween extending the full length of the body portion 14.

As best shown in FIGS. 2 and 3, the connector 10 is used to edgewise connect a first sheet 32 to one side 33 of a second sheet 34. The connector body portion 14 is inserted through a hole 35 formed in the second sheet 34 from an opposite side 36 of the second sheet, with the spaced-apart arms 18 and 20 projecting outwardly from the side 33 of the second sheet. The head portion flange 16 is sized greater than the diameter of the hole 35 to engage the second sheet 34 and prevent the connector 20 from pulling through the hole.

Next, the first sheet 32 is inserted into the slit 30, between spaced-apart arms 18 and 20. No preassembly fabrication of the first sheet 32 is required. A fastener 38, which can, for example, be a screw, is inserted partially into a smooth bore, countersunk aperture 40 coaxial with the body portion 24 and extending the full length of the connector 10. The fastener 38 is inserted from the side 36 of second sheet 34 until it contacts the first sheet 32 positioned in the slit 30, and then the fastener must be turned to threadably engage the first sheet and drive the fastener further into the aperture. As the fastener 38 is driven into the aperture 40, it causes a local portion 44 of the first sheet 32 to deform against a concave wall portion 46 of aperture 40 formed in the arm 20. The aperture 40 is sized in diameter slightly less than the combined thicknesses of the first sheet 32 and the outer diameter of the threads of the fastener 38. As such, when the sheet portion 44 is deformed under the force applied by the fastener 38, the threads of the fastener will cut into the sheet portion 44, thereby both grasping the first sheet and tightly holding it pressed between the fastener and the concave wall portion 46 against any force applied which might tend to extract the first sheet from the slit 30. As the fastener 38 presses the sheet portion 44 against the wall portion 46, the fastener will engage an opposed concave wall portion 47 of the aperture 40 formed in the arm 18, which provides the necessary reactionary force on the fastener.

It will be apparent to one skilled in the art that the edgewise connected first sheet 32 can easily be disconnected from second sheet 34 by unthreading the fastener 38 and removing it from the aperture 40. Since the aperture 40 extends fully through the body portion 14, the deformed sheet portion 44 can be slid easily free of the connector. Likewise, the first sheet 32 can easily be edgewise reconnected to the second sheet 34 simply by positioning the first sheet in the slit 30 and reengaging fastener 38. This easy disassembly/reassembly makes the edgewise connector of the present invention particularly useful in applications that require occasional disassembly to, for example, clean a reflective surface. As described above, the edgewise connection is made solely from the side 36 of the second sheet 34 away from the side 33 to which the first sheet 32 is positioned, thus providing a "blind" connector very useful in situations where access to the side 33 of the second sheet is limited or not available except to position the first sheet in the slit 30. No prefabrication is required for the first sheet 32, and only on-center positioned mounting holes 35 need be formed in the second sheet 34 (i.e., the hole center is aligned with the edge of the first sheet). The connector 10 provides an extremely strong fastener which is particularly useful when fastening a relatively thin sheet edgewise to another sheet with minimum prefabrication and a minimum of parts extending through to the side 33 of the second sheet 34.

While slit 30 is shown extending fully through the body portion 14 to the head portion 12, it need extend toward the head portion only to within a distance equal to or less than the thickness of second sheet 34 if it is desired to fasten the edge of the first sheet 32 in contact with the side 33 of the second sheet 34. The slit 30 can be shallower if the first sheet is to be spaced from the second sheet.

While the embodiment of FIGS. 1–3 has been described using a screw fastener, other forms of fasteners can be used which press the first sheet 32 firmly into engagement with one of the arms 18 or 20, or grasp the first sheet and holds it within the slit 30, such as a wedge, pin or even a chemically expandable material insertable into the aperture 40. One advantage of using a screw is that the turning of the screw to advance it into the aperture 40 also serves to pull the first sheet 32 inward and its edge into tight contact with the side 33 of the second sheet 34.

An alternative second embodiment of the invention is shown in FIGS. 4, 5 and 6, as a blind edgewise connector, indicated by reference numeral 52. For convenience and clarity, the same reference numerals will be used for similar parts in all embodiments. In this embodiment, the body portion 14 of the connector 52 has a pair of spaced-apart arms 54 and 56 which have generally planar interior surfaces 57 and 58, respectively, but the arms are not identical in that the aperture 40 is formed off-center and only in the arm 54. While the aperture 40 is formed off-center, it does intersect with the surface 58 and open laterally into the slit 30, thus providing an elongated opening therebetween, running the length of the arm 58 through which the threads of the fastener 38 may project. The aperture 40 and fastener 38 are sized so that with the fastener in position within the aperture, the threads of the fastener project through to the slit 30 to engage and grab the first sheet 32 when positioned in the slit.

Figure 10:
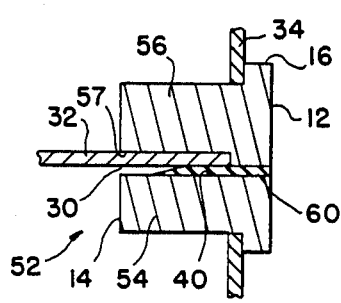
FIG. 10 is a cross-sectional view of a sixth embodiment of the blind edgewise connector, using a wedge fastener.

In this embodiment, the interior surface 58 of the arm 56 provides a flat, anvil-like surface against which the fastener 38 may press the first sheet 32 without significantly deforming the first sheet, thus avoiding the deformed sheet portion 44 produced by the embodiment of the invention of FIGS. 1–3. This promotes easier disassembly and reassembly of the first and the second sheets. An alternative embodiment similar to the connector 52 of FIG. 4 is shown in FIG. 10 using a wedge 60 as the fastener 38. This embodiment requires that the aperture 40 be shaped as a slot.

Shown in FIG. 7 is another alternative embodiment of the invention, which is very similar to the embodiment of FIG. 1. The slit 30 is formed at an acute angle with respect to the second sheet 34. While the edgewise connector of this embodiment will cause a deformed sheet portion 44 of the first sheet 32, use of the off-center aperture 40 such as used with the embodiments of FIGS. 4 and 10 will allow non-deforming connection to the first sheet 32.

Figure 9:
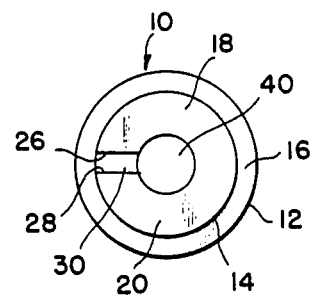
FIG. 9 is an end plan view of a fifth embodiment of the blind edgewise connector, according to the present invention.

As shown in the end plan views of FIGS. 8 and 9 for two additional embodiments, the slit 30 need not be straight (see FIG. 8), nor need it be cut entirely through body portion 14 (see FIG. 9). The edgewise connector of FIG. 8 can be used when the first sheet 32 is curved, such as to attach a curved sheet or the end of a tubular member to the second sheet. The edgewise connector of FIG. 9 can be used to make an edgewise connector to a corner of the first sheet. As described above, although the slits 30 are shown as located coaxial with the apertures 40, the aperture can also be off-center as with the embodiment of FIG. 4 so that a non-deforming edgewise connection to the first sheet 32 can be accomplished. Alternatively, the aperture may be on-center and the slit formed off-center, although this has the disadvantage of requiring the mounting holes 35 for the connector to be formed in the second sheet 34 off-center with respect to the first sheet 32. It is to be understood that while the first and second sheets are referred to as "sheets", the term sheets is intended to encompass a curved or irregular shaped thin walled member, such as a pipe, tube or duct.

Figure 11:
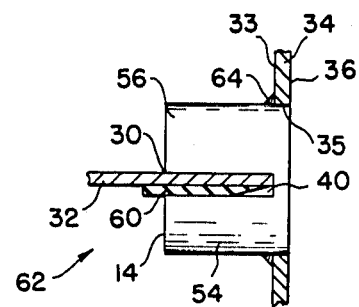
FIG. 11 is a side view of a seventh embodiment of the blind edgewise connector, wherein the user can access the connector from the same side as the edgewise connected sheet and use a wedge fastener.

Turning now to FIG. 11, yet another embodiment of the present invention is shown as a blind edgewise connector 62 having no head portion flange. In this embodiment, the hole 35 in the second sheet 34 may receive the connector 62 from either side of the second sheet 34. The connector 62 can be held in place in the second sheet 34 by any convenient means, such as a weld 64, shown in FIG. 11 formed on the side 33 of the second sheet 34 toward the first sheet 32. The first sheet 32 is inserted into a slit 30 and is held in position therein by the wedge 60. The wedge 60 bears against one surface of sheet 32 to force the other surface of sheet 32 against the opposing interior planar surface of the arm 56. The wedge 60 also bears against the opposing interior surface of arm 54 to provide a reactionary force. As described above, the fastener can take any one of a variety of forms. For example, it can be a wedge of resilient material whose uncompressed dimension exceeds the space between the first sheet 32 and the opposing interior surface of arm 54 against which the edge is positioned. The wedge can be serrated to prevent it from coming out easily and when used to connect a fragile first sheet, such as glass, the wedge can be fabricated from a resilient material, preferably one that frictionally engages the glass. The fastener can also be a chemical composition which expands after it is placed in slit 30 to apply pressure much like a wedge.

While the embodiment of FIG. 10 referred to previously utilizes a slot extending through the entire connector as the aperture 40, the connector can be manufactured similar to the embodiment of FIG. 11 with the slot or any other shaped aperture only extending partly through and accessible only from the side 33 of the second sheet 34. When utilizing a wedge, the slot-shaped aperture 40 and the slit 30 may be formed as one enlarged opening sized to receive the first sheet and the wedge fastener.

In addition to the embodiments shown in the figures, an edgewise connector, according to the present invention, can be a pair of scissored arms that are angularly movable apart and together. The one end portions of the scissor arms can be moved together to be inserted into the mounting hole in the second sheet, and then separated while within the hole to prevent removal from the hole. The opposing end portions can be shaped to provide a gap therebetween similar to the slit 30 to receive the first sheet and a fastener. Insertion of the fastener tends to pivot the arms so that the end portions in the hole open until the edges of the hole are securely engaged. At that point, further insertion of the fastener tends to grasp and tightly hold the first sheet between the gap.

While various modifications of the embodiments whose detailed descriptions are given above will be apparent to one skilled in the art, the scope of the present invention is to be determined only by the following claims.

We claim:

1. A connector for edgewise fastening without prealteration a first sheet of material having opposite first and second sides to a first side of a second sheet of material through a hole formed in the second sheet extending from the first side through to an opposite second side, the hole having an interior hole surface wall, and the first sheet having an elongated edge to be connected in position adjacent to the first side of the second sheet with the edge having a length larger than the width of the hole in the direction the edge extends, comprising:

first and second substantially inflexible arms fixedly positioned relative to each other and sized to be insertable through the hole in the second sheet from the second side of the second sheet, the arms each having an insertion arm portion positionable within the hole and sized to span at least from the first side to the second side of the second sheet and an attachment arm portion attached to the insertion arm portion and sized to project outwardly from the insertion arm portion beyond the first side of the second sheet, the projecting attachment arm portions each terminating in a free end distal from the insertion arm portion, each of the projecting attachment arm portions having an interior surface opposed to and spaced apart from the interior surface of the other projecting attachment arm portion to define an interior space therebetween located to the first side of the second sheet and away from the hole in the second sheet when the first and second arms have their insertion arm portions positioned in the hole, the space having a length extending in the direction of the projecting arm portions sufficient to receive the first sheet therein in edgewise position relative to the second sheet without the first sheet extending into the hole and having a distance between the opposed interior surfaces sufficient to receive the first sheet therewithin with the first side thereof in engagement with the interior surface of the projecting attachment arm portion of the first arm, the space having at least one lateral opening between the projecting attachment arm portions of the first and second arms extending substantially coextensive with the projecting attachment arm portions and an end opening between the projecting attachment arm portions of the first and second arms extending at least partly along the free distal end of the projecting attachment arms and communicating with the lateral opening to form a substantially unobstructed continuous opening sized for the first sheet to project through when positioned in the space, whereby the first sheet can be positioned within the space without pre-alteration and without extending into the hole in the second sheet so as to be in position fully to the first side of the second sheet with the edge of the first sheet edgewise adjacent to the first side of the second sheet in preparation for fastening by the connector to the second sheet;

retaining means formed prior to insertion of the arms into the hole for retaining the arms from pulling through the hole toward the first side of the second sheet without requiring deformation of the retaining means while in the hole to expand the retainer means to engage the interior hole surface wall and without requiring the second sheet to have strength to supply a force counter to the expansion force of the retainer means in the hole, whereby the retaining means is operative even with a very thin second sheet not having the strength to allow use of an expansion member in the hole;

holding means for holding the projecting attachment arm portions in substantially fixed relation to each other; and fastener means insertable in the space between the projecting attachment arm portions and selectively removable therefrom, without application of an impacting force during insertion or removal and without significant deformation of the fastener means, for engaging a portion of the second side of the first sheet and the interior surface of the projecting attachment arm portion of the second arm at a location exterior of the hole and without causing significant movement of the arms relative to each other to force a portion of the first side of the first sheet immediately opposed to the engaged portion of the second side thereof into firm engagement with the interior surface of the projecting attachment arm portion of the first arm without deformation of either the first arm, the second arm, the retaining means or the holding means.

2. The connector of claim 1, wherein the space between the arms includes a passageway accessible from the second side of the second sheet and communicating with at least a portion of the space between the arms wherein the first sheet is positioned, the passageway having a size sufficient to receive the fastener means therein from the second side of the second sheet for operatively positioning the fastener means between the first sheet and the second arm, whereby the user needs access from only the second side of the second sheet.

3. The connector of claim 2, wherein the passageway is a generally lengthwise bore formed partly in the first arm and forming a concavity in the interior surface of the first arm, the fastener means bearing on the first sheet at the concavity to deform a portion of the first sheet into the concavity.

4. The connector of claim 2, wherein the interior surface of the first arm is a substantially smooth surface and the passageway is a generally lengthwise extending aperture formed in the second arm away from the first arm, the aperture communicating with the space between the arms wherein the first sheet is positioned along at least a portion of its length coextensive with the space, the fastener means projecting out of the aperture into the portion of the space between the arms wherein the first sheet is positioned to engage the first sheet.

5. The connector of claim 1, wherein the means for retaining the arms from pulling through the hole is a head member positionable on the second side of the second sheet and sized larger than the hole, the head member being attached to the arms.

6. The connector of claim 1, wherein the means for holding the arms in fixed relation is a member rigidly attached to each of the arms.

7. The connector of claim 1, wherein the fastener means is a threaded screw.

8. The connector of claim 7, wherein the space is sized smaller than the combined thickness of the first sheet and the diameter of the screw to cause the threads of the screw to cut into the first sheet as the screw is turned to advance the screw into the space with the first sheet positioned therein.

9. The connector of claim 7, wherein the opposed interior surfaces comprise generally uniformly spaced apart curved surfaces.

10. The connector of claim 1, wherein the fastener means is a wedge.

11. The connector of claim 1, wherein the means for retaining the arms from pulling through the hole is a weld formed between the connector and the second sheet.

12. The connector of claim 1, wherein the interior surfaces of the arms are substantially uniformly spaced apart by approximately the thickness of the first sheet, and the space between the arms includes a generally lengthwise extending bore accessible from the second side of the second sheet and communicating with at least a portion of the space between the arms wherein the first sheet is positioned, the bore having a size sufficient to receive the fastener means therein from the second side of the second sheet for operatively positioning the fastener means between the first sheet and the second arm.

13. A blind connector for edgewise fastening without pre-alteration a first thin-walled member having opposite first and second sides to a first side of a second thin-walled member through a hole formed in the second member extending from the first side through to an opposite second side, the hole having an interior hole surface wall, and the first member having an elongated edge to be connected in position adjacent to the first side of the second member with the edge having a length larger than the width of the hole in the direction the edge extends, the connector being useable when a user needs access to the blind connector from only the opposite second side of the second member, the blind connector comprising:

a body portion sized to be inserted through the hole in the second member from the second side thereof and a head portion attached to the body portion and sized to engage the second side of the second member to prevent the body portion from pulling through the hole toward the first member, the head portion being formed prior to insertion of the body portion into the hole, the body portion having first and second substantially inflexible arms fixedly positioned relative to each other, the arms each having an insertion arm portion positionable within the hole and sized to span at least from the first side to the second side of the second member and an attachment arm portion attached to the insertion arm portion and sized to project outwardly from the insertion arm portion beyond the first side of the second member, the projecting attachment arm portions each terminating in a free end distal from the insertion arm portion, each of the projecting attachment arm portions having an interior surface opposed to and spaced apart from the interior surface of the other projecting attachment arm portion to define an interior space therebetween located to the first side of the second member and away from the hole in the second member when the first and second arms have their insertion arm portions positioned in the hole, the space having a length extending in the direction of the projecting arm portions sufficient to receive the first member therein in edgewise position relative to the second member without the first member extending into the hole and having a distance between the opposed interior surfaces sufficient to receive the first sheet therewithin with the first side thereof in engagement with the interior surface of the projecting attachment arm portion of the first arm, the space having a pair of generally opposed lateral openings between the projecting attachment arm portions of the first and second arms on opposite lateral portions thereof extending substantially coextensive with the projecting attachment arm portions from the insertion arm portions to the free ends of the projecting attachment arms and an end opening between the projecting attachment arm portions of the first and second arms extending along the free distal end of the projecting attachment arms and connecting with the opposite lateral openings to form a substantially unobstructed continuous opening sized for the first member to project through when positioned in the space, whereby the first member can be positioned within the space without pre-alteration and without extending into the hole in the second member so as to be in position fully to the first side of the second member with the edge of the first member edgewise adjacent to the first side of the second member in preparation for fastening by the connector to the second member, the projecting attachment arm portions being held in substantially fixed relation to each other, the connector further including an aperture accessible from the second side of the second member and extending through the head portion and beyond the insertion arm portions to the projecting attachment arm portions, the aperture communicating with the space between the projecting attachment arm portions and being sized to receive a selectively removable fastener therein from the second side of the second member, the fastener being insertable through the aperture into a position projecting into the space to operatively engage the second side of the first member and the interior surface of the projecting attachment arm portion of the second arm at a location exterior of the hole and within the space without causing significant movement of the arms relative to each other to apply a force on the first member to bring the first side of the first member into firm engagement with the interior surface of the projecting attachment arm portion of the first arm without deformation of the first or second arms.

14. The blind connector of claim 13, wherein the aperture is a generally lengthwise bore formed at least partly in the first arm and defining a concavity in the interior surface of the projecting attachment arm portion of the first arm, the fastener after being inserted into the bore having at least a portion thereof positioned in the space to bear on the first member at the concavity to deform a portion of the first member into the concavity.

15. The blind connector of claim 14, wherein the body portion is generally cylindrical, and the bore is generally cylindrical and coaxial with the body portion.

16. The blind connector of claim 15 wherein the bore has a substantially smooth sidewall without prefabricated screw threads and the fastener is a threaded screw with threads of sufficient hardness to cut into and thereby grab the first member to prevent its removal from the space.

17. The blind connector of claim 14 wherein the interior surfaces of the projecting attachment arm portions of the first and second arms are generally uniformly spaced apart along their coextensive portions and the spaced defined thereby is a slit therebetween extending transversely fully through the body portion between the opposite lateral openings, and wherein the bore has its axis generally aligned with the slit.

18. The blind connector of claim 13, wherein the interior surfaces of the projecting attachment arm portions of the first and second arms are generally parallel planar surfaces and the space defined thereby is a slit therebetween extending transversely fully through the body portion and having a distance between the interior surfaces approximately equal to the thickness of the first member.

19. The blind connector of claim 13, wherein the aperture is a generally lengthwise bore formed in the second arm and away from the first arm, the bore and the space defining an opening therebetween along at least a portion of their coextensive lengths, the fastener when positioned in the bore projecting through the opening into the space to operatively engage the first member.

20. The blind connector of claim 19, wherein the interior surfaces of the first and second arms are generally uniformly spaced apart along their coextensive portions and define a slit therebetween extending at least partially transversely through the body portion.

21. The blind connector of claim 13, wherein the fastener is a threaded screw.

22. The blind connector of claim 21, wherein the screw has threads with sufficient hardness to cut into and thereby grab the first member.

23. The blind connector of claim 21, wherein the interior surfaces defining the space and the aperture in the location where the fastener projects to engage the first member have a total overall dimension smaller than the combined thickness of the first member and the screw to cause the threads of the screw to cut into the first member as the screw is turned to advance the screw into the aperture with the first member positioned in the space while securing the first member against removal from the space.

24. The blind connector of claim 13, wherein the fastener is a wedge.

25. An apparatus comprising:
 a first thin-walled member having opposite first and second sides and an elongated edge, a second thin-walled member having opposite first and second sides with a hole formed in the second member extending from the first side through to the second side of the second member, the hole having an interior hole surface wall, the edge of the first member being positioned adjacent to the first side of the second member and the edge having a length larger than the width of the hole in the direction the edge extends;

a connector having a body portion inserted through the hole in the second member and a head portion attached to the body portion and engaged with the second member to prevent the body portion from pulling through the hole toward the first member, the body portion having first and second substantially inflexible arms fixedly positioned relative to each other, the arms each having an insertion arm portion positioned within the hole and sized to span at least from the first side to the second side of the second member and an attachment arm portion attached to the insertion arm portion and sized to project outwardly from the insertion arm portion beyond the first side of the second member, the projecting attachment arm portions each terminating in a free end distal from the insertion arm portion, each of the projecting attachment arm portions having an interior surface opposed to and spaced apart from the interior surface of the other projecting attachment arm portion to define an interior space therebetween located to the first side of the second member and away from the hole in the second member, the space having a length extending in the direction of the projecting arm portions sufficient to receive the first member therein in edgewise position relative to the second member without the first member extending into the hole and having a distance between the opposed interior surfaces sufficient to receive the first member therewithin with the first side thereof in engagement with the interior surface of the projecting attachment arm portion of the first arm, the space having a pair of generally opposed lateral openings between the projecting attachment arm portions of the first and second arms on opposite lateral portions thereof extending substantially coextensive with the projecting attachment arm portions from the insertion arm portions to the free ends of the projecting attachment arms and an end opening between the projecting attachment arm portions of the first and second arms extending along the free distal end of the projecting attachment arms and connecting with the opposite lateral openings to form a substantially unobstructed continuous opening sized for the first member to project through to the exterior of the connector, the first member being positioned within the space without pre-alteration and without extending into the hole in the second member in position fully to the first side of the second member with the edge of the first member edgewise adjacent to the first side of the second member, the projecting attachment arm portions being held in substantially fixed relation to each other, the connector further including an aperture communicating with the space between the projecting attachment arm portions and sized to receive a selectively removable fastener therein, the fastener being insertable through the aperture into a position projecting into the space to operatively engage the second side of the first member and the interior surface of the projecting attachment arm portion of the second arm at a location exterior of the hole and within the space without causing significant movement of the arms relative to each other, the fastener applying a force on the first member to bring the first member into firm engagement with the interior surface of the projecting attachment arm portion of the first arm without deformation of the first or second arms.

26. The apparatus of claim 25 wherein the aperture is accessible from the second side of the second member and extends through the head portion to the body portion.

27. The apparatus of claim 25 wherein the head portion includes a head flange having a size greater than the hole to engage the second side of the second member and prevent the connector from pulling through the hole in the direction toward the first member.

28. The apparatus of claim 25 wherein the interior surfaces of the projecting attachment arm portions of the first and second arms are generally uniformly spaced apart along their coextensive portions and the space defined thereby is a slit therebetween extending transversely fully through the body portion between the opposite lateral openings, the slit having a width approximately equal to the thickness of the first member.

29. The apparatus of claim 25, further including a concavity in the interior surface of the projecting attachment arm portion of the first arm, and wherein the fastener after being inserted into the aperture having at least a portion thereof positioned in the space to bear on the first member at the concavity to deform a portion of the first member into the concavity.

30. The apparatus of claim 25, wherein the aperture is formed in the second arm and away from the first arm, the aperture and the space defining an opening therebetween along at least a portion of their coextensive lengths, the fastener when positioned in the bore projecting through the opening into the space to operatively engage the first member.

31. The apparatus of claim 30, wherein at least a portion of the interior surface of the first arm corresponding to the location at which the fastener engages the first member is a substantially smooth surface.

32. The apparatus of claim 25, wherein the interior surfaces defining the space and the aperture in the location where the fastener projects to engage the first member have a total overall dimension smaller than the combined thickness of the first member and the fastener.

33. The apparatus of claim 32, wherein the fastener is a threaded screw and the space and aperture are sized to cause the threads of the screw to cut into the first member as the screw is turned to advance the screw into the aperture with the first member positioned in the space.

34. A method for edgewise fastening without prealteration a first sheet of material to a second sheet of material, comprising:
providing a first sheet of material having opposite first and second sides and an elongated edge;
providing a second sheet of material having opposite first and second sides;
forming a hole in the second sheet extending from the first side through to the second side with the hole having an interior hole surface wall;
positioning the edge adjacent to the first side of the second sheet and providing the edge with a length larger than the width of the hole in the direction the edge extends;

providing a connector with first and second substantially inflexible arms fixedly positioned relative to each other and sized to be insertable through the hole in the second sheet from the second side of the second sheet, the arms each having an insertion arm portion positionable within the hole and sized to span at least from the first side to the second side of the second sheet and an attachment arm portion attached to the insertion arm portion and sized to project outwardly from the insertion arm portion beyond the first side of the second sheet, the projecting attachment arm portions each terminating in a free end distal from the insertion arm portion, each of the projecting attachment arm portions having an interior surface opposed to and spaced apart from the interior surface of the other projecting attachment arm portion to define an interior space therebetween located to the first side of the second sheet and away from the hole in the second sheet when the first and second arms have their insertion arm portions positioned in the hole, the space having a length extending in the direction of the projecting arm portions sufficient to receive the first sheet therein in edgewise position relative to the second sheet without the first sheet extending into the hole, the space having a distance between the opposed interior surfaces sufficient to receive the first sheet therewithin with the first side thereof in engagement with the interior surface of the projecting attachment arm portion of the first arm, the space having at least one lateral opening between the projecting attachment arm portions of the first and second arms extending substantially coextensive with the projecting attachment arm portions and an end opening between the projecting attachment arm portions of the first and second arms extending at least partly along the free distal end of the projecting attachment arms and communicating with the lateral opening to form a substantially unobstructed continuous opening sized for the first sheet to project through when positioned in the space;

inserting the arms of the connector in the hole with the insertion arm portion of each arm positioned within the hole with the attachment arm portion projecting beyond the first side of the second sheet;

positioning the first sheet within the space without pre-alteration and without extending into the hole in the second sheet by passing the first sheet through the lateral and end openings to place the first sheet in position fully to the first side of the second sheet with the edge of the first sheet edgewise adjacent to the first side of the second sheet;

providing retaining means, formed prior to insertion of the arms into the hole, for retaining the arms from pulling through the hole toward the first side of the second sheet;

positioning the retaining means to engage the second sheet without requiring deformation of the retaining means while the arms are in the hole to expand the retainer means to engage the interior hole surface wall and without requiring the second sheet to have strength to supply a force counter to any expansion force of the retainer means in the hole;

providing holding means for holding the projecting attachment arm portions in substantially fixed relation to each other; and providing an elongated fastener with screw threads;

removably inserting the fastener in the space between the projecting attachment arm portions in parallel alignment with the first sheet in the space without application of an impacting force and without significant deformation of the fastener, with the screw threads of the fastener grippingly engaging the second side of the first sheet and contacting the interior surface of the projecting attachment arm portion of the second arm at a location exterior of the hole and without causing significant movement of the arms relative to each other, the fastener being rotated to advance into the space and force the first side of the first sheet into firm engagement with the interior surface of the projecting attachment arm portion of the first arm without deformation of either the first or second arms.

* * * * *